United States Patent [19]

Brooks

[11] Patent Number: 4,592,840
[45] Date of Patent: Jun. 3, 1986

[54] EASY REACH COFFEE FILTERS AND OPTIONAL REUSABLE STORAGE CONTAINER

[76] Inventor: David L. Brooks, 6766 Racquet Club Dr., Memphis, Tenn. 38119

[21] Appl. No.: 757,363

[22] Filed: Jul. 22, 1985

[51] Int. Cl.[4] ............................................. B01D 35/02
[52] U.S. Cl. ................................ 210/493.5; 210/387; 210/497.2; 206/494; 206/515; 206/820; 220/406; 221/63
[58] Field of Search ................ 210/474, 497.01, 497.2, 210/483, 496, 500.1, 493.5, 387, 337, 342; 206/233, 494, 812, 820, 515, 519, 520; 220/406, 407; 221/63, 45, 46; 55/354

[56] References Cited

U.S. PATENT DOCUMENTS

| | | | |
|---|---|---|---|
| 3,444,791 | 5/1969 | Honsel | 210/497.2 |
| 3,800,954 | 4/1974 | Lampcov | 210/497.2 |
| 3,836,044 | 9/1974 | Tilp et al. | 221/63 |
| 3,979,020 | 9/1976 | Braber et al. | 221/63 |
| 4,159,772 | 7/1979 | Beck | 221/63 |
| 4,200,200 | 4/1980 | Hein, III et al. | 221/63 |
| 4,362,623 | 12/1982 | Holopainen | 206/515 |
| 4,469,243 | 9/1984 | Ito et al. | 221/63 |

FOREIGN PATENT DOCUMENTS 2921437  1/1980  Fed. Rep. of Germany ... 210/497.2

*Primary Examiner*—Benoit Castel

[57] ABSTRACT

Circular sections of coffee filter papers are interconnected along a portion of their sides, the paper being perforated along the lines where adjacent sections meet. The sections are pressed into the shape of cups alternately concave upward and downward and stacked inside one another by folding along the perforated line, the stack of coffee filter cups being placed in a dispensing box having a top opening.

1 Claim, 7 Drawing Figures

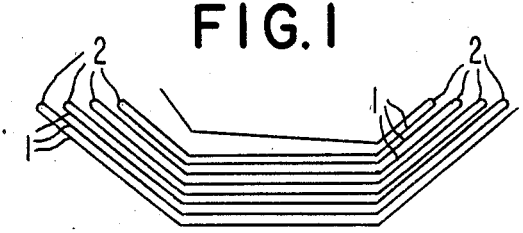
FIG.1
FIG.2
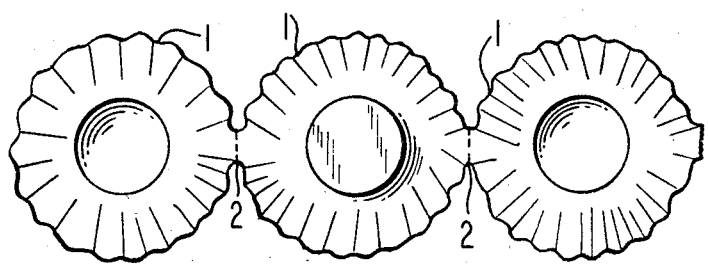
FIG.3
FIG.4
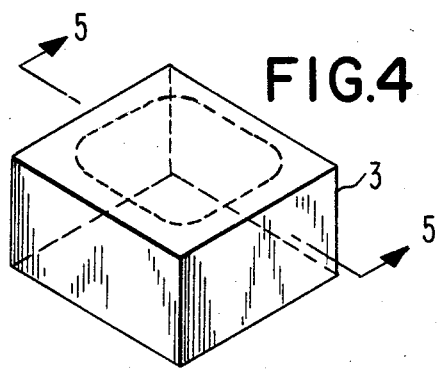
FIG.5
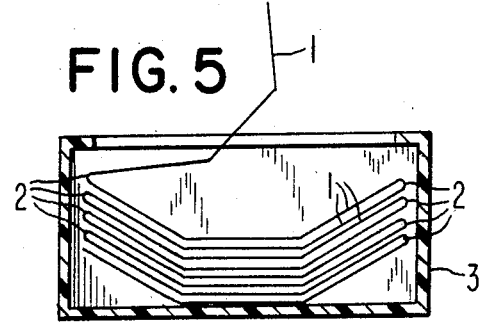
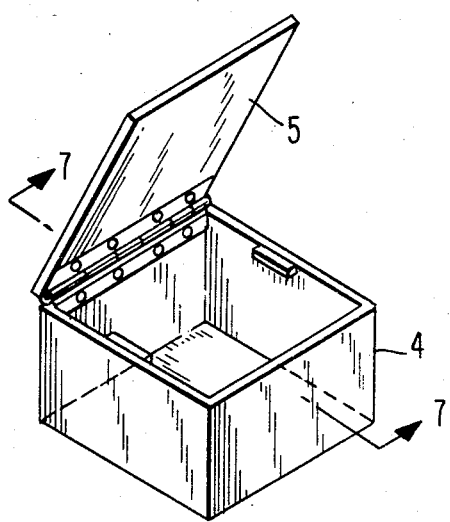
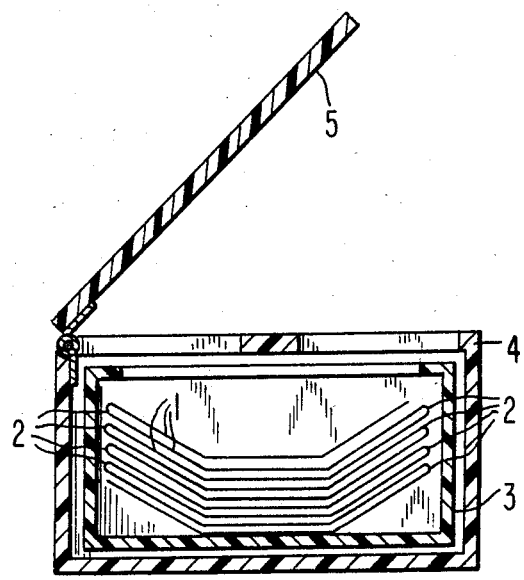
FIG.6
FIG.7

EASY REACH COFFEE FILTERS AND OPTIONAL REUSABLE STORAGE CONTAINER

BACKGROUND OF THE INVENTION

FIELD OF THE INVENTION

This invention relates to coffee filter cups and a dispenser thereof.

SUMMARY OF THE INVENTION

Coffee filter cups stacked in boxes are often difficult to separate. As a result, several filter cups are sometimes unintentionally used at the same time, which is wasteful or the cups are handled excessively before use, which is unsanitary. The object of this invention is to provide means of dispensing one coffee filter at a time with minimum handling.

BRIEF DESCRIPTION OF THE DRAWINGS

FIG. 1 is a side elevational view of a stack of coffee filters shown in accordance with the present invention;

FIG. 2 is a side elevational view of the coffee filters shown in an unfolded position;

FIG. 3 is a top plan view taken from FIG. 2;

FIG. 4 is a perspective view of a dispenser box, (coffee filters not shown).

FIG. 5 is a cross-section view taken along line 5—5 of FIG. 4, (coffee filters added.);

FIG. 6 is a perspective view of another embodiment of a re-usable storage container (coffee filters not shown) and, FIG. 7 is a cross-section view taken along line 7—7 of FIG. 6 (coffee filter dispenser added).

DETAILED DESCRIPTION

Circular sections of coffee filter paper, 1, are interconnected along a portion of their sides 2, the paper being perforated along the lines along which sections of filter paper meet. The sections of the filter paper are pressed into the shape of cups, with cups alternating concave downward and upward. The cup-shaped filter cups are stacked inside one another by folding along the connecting perforated side and a stack of filter cups thus formed is placed in a dispensing box 3 having an opening at the top. The dispensing box 3 with coffee filter cups is in turn placed inside a box 4 having a hinged lid 5.

While various changes may be made in the detail construction, it is understood that such changes will be within the spirit and scope of the present invention, as is defined by the appended claims.

What I now claim is:

1. A coffee filters assembly, comprising, in combination, an elongated, strip of filter paper die-cut into a row of a plurality of interconnected circular sections having an interconnection therebetween, said interconnection comprising a short length of uncut abutting peripheries of adjacent said sections, a straight row of perforations across said interconnection, a peripheral portion of each said section being radially folded forming a plurality of flutes and shaping said section into a cup, each adjacent said cup being dished into opposite directions, a fold along each said row of perforations, each alternate said fold being in the same direction and opposite to the said folds therebetween, whereby all said cups are nested one into another; and said assembly including a dispenser for said cups, said dispenser comprising an open-topped inner box containing said nested cups and a hinged-covered box containing said inner box.

* * * * *